United States Patent
Grochowski et al.

(10) Patent No.: US 7,437,581 B2
(45) Date of Patent: Oct. 14, 2008

(54) METHOD AND APPARATUS FOR VARYING ENERGY PER INSTRUCTION ACCORDING TO THE AMOUNT OF AVAILABLE PARALLELISM

(75) Inventors: Edward Grochowski, San Jose, CA (US); John Shen, San Jose, CA (US); Hong Wang, Fremont, CA (US); Doron Orenstein, Haifa (IL); Gad S Sheaffer, Haifa (IL); Ronny Ronen, Haifa (IL); Murali M. Annavaram, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 567 days.

(21) Appl. No.: 10/952,627

(22) Filed: Sep. 28, 2004

(65) Prior Publication Data

US 2006/0095807 A1    May 4, 2006

(51) Int. Cl.
*G06F 1/32* (2006.01)
*G06F 9/46* (2006.01)

(52) U.S. Cl. .................. 713/320; 718/102; 718/105
(58) Field of Classification Search ............... 713/300, 713/320, 323
See application file for complete search history.

(56) References Cited

U.S. PATENT DOCUMENTS

| 6,411,156 | B1 | 6/2002 | Borkar et al. | |
|---|---|---|---|---|
| 6,564,328 | B1 | 5/2003 | Grochowski et al. | |
| 6,804,632 | B2 | 10/2004 | Orenstien et al. | |
| 2001/0003207 | A1 | 6/2001 | Kling et al. | |
| 2002/0188877 | A1* | 12/2002 | Buch | 713/320 |
| 2003/0041228 | A1* | 2/2003 | Rosenbluth et al. | 712/220 |
| 2003/0079093 | A1* | 4/2003 | Fujii et al. | 711/147 |
| 2003/0110012 | A1* | 6/2003 | Orenstien et al. | 702/188 |
| 2003/0117175 | A1 | 6/2003 | Green et al. | |
| 2004/0088708 | A1* | 5/2004 | Ramanujam et al. | 718/107 |
| 2005/0155032 | A1* | 7/2005 | Schantz | 718/100 |
| 2007/0094444 | A1* | 4/2007 | Sutardja | 711/112 |

FOREIGN PATENT DOCUMENTS

WO    WO 99/17186 A    4/1999

OTHER PUBLICATIONS

Rakesh Kumar, A Multi-Core Approach to Addressing the Energy-Complexity Problem in Microprocessors, Jun. 2003, HP Labs, pp. 1-7.*

(Continued)

*Primary Examiner*—Suresh K Suryawanshi
(74) *Attorney, Agent, or Firm*—Blakely, Sokoloff, Taylor & Zafman LLP

(57) ABSTRACT

A method and apparatus for changing the configuration of a multi-core processor is disclosed. In one embodiment, a throttle module (or throttle logic) may determine the amount of parallelism present in the currently-executing program, and change the execution of the threads of that program on the various cores. If the amount of parallelism is high, then the processor may be configured to run a larger amount of threads on cores configured to consume less power. If the amount of parallelism is low, then the processor may be configured to run a smaller amount of threads on cores configured for greater scalar performance.

50 Claims, 11 Drawing Sheets

OTHER PUBLICATIONS

PCT Internationational Search Report for PCT/US2005/035145 mailed Aug. 2, 2006.

PCT Internationational Written Opinion for PCT/US2005/035145 mailed Aug. 2, 2006.

R. Kumar et al., "A Multi-Core Approach to Addressing the Energy-Complexity Problem in Microprocessors," Proceedings of the Workshop on Complexity-Effective Design, [on-line], Jun. 30, 2003.

Kumar, R. et al., *Single-ISA Heterogeneous Multi-Core Architectures for Multithreaded Workload Performance*, ACM SIGARCH Computer Architecture News, vol. 32, Issue 2, pp. 64-75, Mar. 2004.

Morad, T. et al., *ACCMP—Asymmetric Cluster Chip Multi-Processing*, CCIT Report #488, May 2004.

Manne, S. et al., *Pipeline Gating: Speculation Control for Energy Reduction*, Proceedings of the 25th Annual International Symposium on Computer Architecture, Barcelona, Spain, Jun. 27-Jul. 2, 1998, pp. 132-141.

Figueiredo, R. et al., *Impact of Heterogeneity on DSM Performance*, 6th International Symposium on High Performance Computer Architecture, Toulouse, France, Jan. 2000, pp. 26-35.

Albonesi, D., *Selective Cache Ways: On-Demand Cache Resource Allocation*, Proceedings of the 32nd Annual ACM/IEEE International Symposium on Microarchitecture, Haifa, Israel, Nov. 16-18, 1999, pp. 248-259.

Folegnani, D. et al., *Energy-Effective Issue Logic*, Proceedings of the 28th Annual International Symposium on Computer Architecture, Göteborg, Sweden, Jun. 30-Jul. 4, 2001, pp. 230-239.

Bahar, R. et al., *Power and Energy Reduction Via Pipeline Balancing*, Proceedings of the 28th Annual International Symposium on Computer Architecture, Göteborg, Sweden, Jun. 30-Jul. 4, 2001, pp. 218-229.

Seng, J. et al., *Power-Sensitive Multithreaded Architecture*, Proceedings of the 2000 IEEE International Conference on Computer Design: VLSI in Computers & Processors, Austin, TX, Sep. 17-20, 2000, pp. 199-206.

Menasce, D. et al., *Cost-Performance Analysis of Heterogeneity in Supercomputer Architectures*, Proceedings of the 1990 Conference on Supercomputing, New York, NY, Nov. 12-16, 1990, pp. 169-177.

Diefendorff, D., *Power4 Focuses on Memory Bandwidth: IBM Confronts IA-64, Says ISA Not Important*, Microprocessor Report, vol. 13, No. 13, 7 pages, Oct. 6, 1999.

Gebotys, C. et al., *Power Minimization in Heterogeneous Processing*, Proceedings of the 29th Annual Hawaii Conference on System Sciences, Maui, Hawaii, Jan. 3-6, 1996, pp. 330-337.

Efthymiou, A. et al., *Adaptive Pipeline Depth Control for Processor Power-Management*, Proceedings of the 2002 IEEE International Conference on Computer Design: VLSI in Computers & Processors, Freiburg, Germany, Sep. 16-18, 2002, pp. 454-457.

Delaluz, V. et al., *Reducing dTLB Energy Through Dynamic Resizing*, Proceedings of the 21st International Conference on Computer Design, San Jose, CA, Oct. 13-15, 2003, pp. 358-363.

Buyuktosunoglu, A. et al., *Energy Efficient Co-Adaptive Instruction Fetch and Issue*, Proceedings of the 30th Annual International Symposium on Computer Architecture, San Diego, CA, Jun. 9-11, 2003, pp. 147-156.

Brooks, D. et al., *Dynamic Thermal Management for High-Performance Microprocessors*, Proceedings of the 7th International Symposium on High-Performance Computer Architecture, Monterrey, Mexico, Jan. 20-24, 2001, pp. 171-182.

Barroso, L. et al., *Piranha: A Scalable Architecture Based on Single-Chip Multiprocessing*, Proceedings of the 27th International Symposium on Computer Architecture, Vancouver, British Columbia, Jun. 10-14, 2000, pp. 282-293.

Baniasadi, A. et al., *Branch Predictor Prediction: A Power-Aware Branch Predictor for High-Performance Processors*, Proceedings of the 2002 IEEE International Conference on Computer Design: VLSI in Computers & Processors, Freiburg, Germany, Sep. 16-18, 2002, pp. 458-461.

Aragon, J. et al., *Power-Aware Control Speculation through Selective Throttling*, Proceedings of the 9th International Symposium on High-Performance Computer Architecture, Anaheim, CA, Feb. 8-12, 2003, pp. 103-112.

Evans, S., *ISL6565BEVAL1: Voltage Regulator Down Solutions for Intel Designs*, Intersil Americas Inc., Application Note AN1126, 16 pages, Feb. 2004.

Albonesi, D. et al., *Dynamically Tuning Processor Resources with Adaptive Processing*, Computer, IEEE Computer Society, vol. 36, No. 12, Dec. 2003, pp. 49-58.

International Roadmap Committee, *International Technology Roadmap for Semiconductors: Executive Summary*, 2003 Edition, 65 pages.

Fleischmann, M., *LongRun™ Power Management: Dynamic Power Management for Crusoe™ Processors*, Transmeta Corporation, 18 pages, Jan. 17, 2001.

Gonzalez, J. et al., *Dynamic Cluster Resizing*, Proceedings of the 21st International Conference on Computer Design, San Jose, CA, Oct. 13-15, 2003, pp. 375-378.

Kumar, R. et al., *Single-ISA Heterogeneous Multi-Core Architectures: The Potential for Processor Power Reduction*, Proceedings of the 36th International Symposium on Microarchitecture, San Diego, CA, Dec. 3-5, 2003, pp. 81-92.

Oka, M. et al., *Designing and Programming the Emotion Engine*, IEEE Micro, Nov.-Dec. 1999, pp. 20-28.

Parikh, D. et al., *Power Issues Related to Branch Prediction*, Proceedings of the 8th International Symposium on High-Performance Computer Architecture, Boston, MA, Feb. 2-6, 2002, pp. 233-244.

Tschanz, J. et al., *Dynamic-Sleep Transistor and Body Bias for Active Leakage Power Control of Microprocessors*, IEEE Journal of Solid-State Circuits, vol. 38, No. 11, Nov. 2003, pp. 1838-1845.

Turner, V. et al., *Sun's Throughput Computing Strategy to Create a Quantum Change in Server Performance*, IDC white paper, Feb. 25, 2004.

Gunther, S. et al., *Managing the Impact of Increasing Microprocessor Power Consumption*, Intel Technology Journal, Q1 issue, 2001.

Isci, C. et al., *Runtime Power Monitoring in High-End Processors: Methodology and Empirical Data*, Proceedings of the 36th Annual IEEE/ACM International Symposium on Microarchitecture, San Diego, CA, Dec. 3-5, 2003, pp. 93-104.

Stonebraker, M. et al., *The Design of POSTGRES*, Proceedings of the 1986 ACM SIGMOD International Conference on Management of Data, Washington, DC, May 28-30, 1986, pp. 340-355.

Hammond, L. et al., *The Stanford Hydra CMP*, HotChips '99, Palo Alto, CA, Sep. 1999.

\* cited by examiner

METHOD AND APPARATUS FOR VARYING ENERGY PER INSTRUCTION ACCORDING TO THE AMOUNT OF AVAILABLE PARALLELISM

FIELD

The present disclosure relates generally to microprocessors that may execute programs with varying amounts of scalar and parallel resource requirements, and more specifically to microprocessors employing multiple cores.

BACKGROUND

Computer workloads, in some embodiments, run in a continuum from those having little inherent parallelism (being predominantly scalar) to those having significant amounts of parallelism (being predominantly parallel), and this nature may vary from segment to segment in the software. Typical scalar workloads include software development tools, office productivity suites, and operating system kernel routines. Typical parallel workloads include 3D graphics, media processing, and scientific applications. Scalar workloads may retire instructions per clock (IPCs) in the range of 0.2 to 2.0, whereas parallel workloads may achieve throughput in the range of 4 to several thousand IPC. The latter high IPCs may be obtainable through the use of instruction-level parallelism and thread-level parallelism.

Prior art microprocessors have often been designed with either scalar or parallel performance as the primary objective. To achieve high scalar performance, it is often desirable to reduce execution latency as much as possible. Micro-architectural techniques to reduce effective latency include speculative execution, branch prediction, and caching. The pursuit of high scalar performance has resulted in large out-of-order, highly speculative, deep pipeline microprocessors. To achieve high parallel performance, it may be desirable to provide as much execution throughput (bandwidth) as possible. Micro-architectural techniques to increase throughput include wide superscalar processing, single-instruction-multiple-data instructions, chip-level multiprocessing, and multithreading.

Problems may arise when trying to build a microprocessor that performs well on both scalar and parallel tasks. One problem may arise from a perception that design techniques needed to achieve short latency are in some cases very different from the design techniques needed to achieve high throughput.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
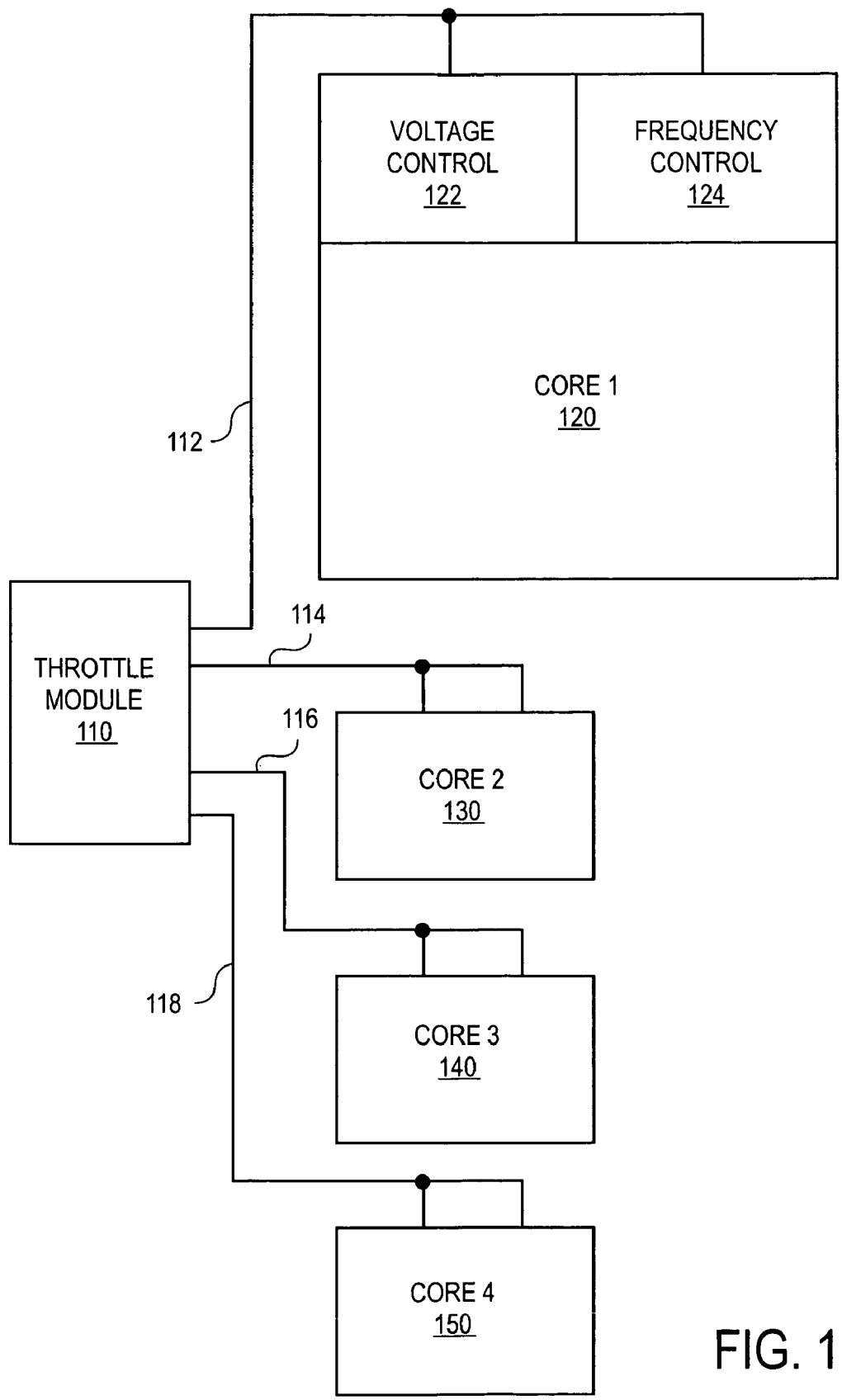
FIG. 1 is a schematic diagram of a processor including cores configurable by voltage and frequency, according to one embodiment.

The following description describes techniques for varying the amount of energy expended to process each instruction according to the amount of parallelism available in a software program. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments, the invention is disclosed in the form of multi-core implementations of Pentium® compatible processor such as those produced by Intel® Corporation. However, the invention may be practiced in other kinds of processors, such as an Itanium Processor Family compatible processor, an X-Scale® family compatible processor, or any of a wide variety of different general-purpose processors from any of the processor architectures of other vendors or designers. Additionally, some embodiments may include or may be special purpose processors, such as graphics, network, image, communications, or any other known or otherwise available type of processor.

Power efficiency may be measured in terms of instructions-per-second (IPS) per watt. The IPS/watt metric is equivalent to energy per instruction, or, more precisely, IPS/watt is proportional to the reciprocal of energy per instruction as follows, $$(IPS)/(Watt) = (Instructions)/(Joule) \qquad \text{EQUATION 1}$$

An important property of the energy per instruction metric is that it is independent of the amount of time required to process an instruction. This makes energy per instruction a useful metric for throughput performance.

An approximate analysis of a microprocessor's power consumption may be performed by modeling the microprocessor as a capacitor that is charged or discharged with every instruction processed (for simplicity, the leakage current and short-circuit switching current may be ignored). With this assumption, energy per instruction may depend on only two things: the amount of capacitance toggled to process each instruction (from fetch to retirement), and power supply voltage. The well-known formula:

$$E = CV^2/2 \qquad \text{EQUATION 2}$$

which is normally applied to capacitors, may be applied to microprocessors as well. E is the energy required to process an instruction; C is the amount of capacitance toggled in processing the instruction; and V is the power supply voltage.

A microprocessor may operate within a fixed power budget such as, for example, 100 watts. Averaged over some time period, the microprocessor's power consumption should not exceed the power budget regardless of what the microprocessor or software do. To achieve this objective, a microprocessor may incorporate some form of dynamic thermal management. Similarly, a chip-level multiprocessor may regulate (or throttle) its activities to stay within a fixed power budget regardless of whether it is retiring, for example, 0.2 instructions per clock (IPC) or 20 IPC. To deliver good performance, the chip-level multiprocessor should be able to vary its MIPS/watt, or equivalently its energy/instruction, over a 100:1 range in this example.

One approach to designing a microprocessor that may achieve both high scalar performance and high throughput performance is to dynamically vary the amount of energy expended to process each instruction according to the amount of parallelism available or estimated to be available in the software. In other words, if there is a small amount of parallelism, a microprocessor may expend all available energy processing a few instructions; and, if there is a greater amount of parallelism, the microprocessor may expend very little energy in processing each instruction. This may be expressed as:

$$P = (EPI) \times (IPS) \qquad \text{EQUATION 3}$$

where P is the fixed power budget, EPI is the average energy per retired instruction, and IPS is the aggregate number of instructions retired per second across all processor cores. This embodiment attempts to maintain the total multiprocessor chip power at a nearly constant level.

Complementary Metal-Oxide-Semiconductor (CMOS) voltage and frequency scaling may be used to achieve different energy per instruction ratios. In one embodiment, logic varies the microprocessor's power supply voltage and clock frequency in unison according to the performance and power levels desired. To maintain a chip-level multiprocessor's total power consumption within a fixed power budget, voltage and frequency scaling may be applied dynamically as follows. In phases of low thread parallelism, a few cores may be run using high supply voltage and high frequency for best scalar performance. In phases of high thread parallelism, many cores may be run using low supply voltage and low frequency for best throughput performance. Since low power consumption for inactive cores may be desirable, leakage control techniques such as dynamic sleep transistors and body bias may be used.

Referring now to FIG. 1, a schematic diagram of a processor including cores configurable by voltage and frequency is shown, according to one embodiment. Core 1 120, core 2 130, core 3 140, and core 4 150 are shown, but in other embodiments there may be more or fewer than four cores in a processor. One or more of the cores may have a voltage control circuit and a clock frequency control circuit. FIG. 1 expressly shows core 1 120 possessing voltage control circuit 122 and frequency control circuit 124, but the other cores may have equivalent circuits as well, or the voltage control and frequency control logic may be separate logic not directly associated with a particular core.

A throttle module 110 may be used to gather information and make a determination about, or an estimate of, the amount of parallelism present in the executing software program. In one embodiment, the amount of parallelism may be the number of simultaneous threads supported. In other embodiments, other metrics may be used to express the amount of parallelism, such as the aggregate number of instructions retired per second, or the number of branch instructions that may support speculative multithreaded execution. Throttle module 110 may utilize information provided by the operating system to aid in the determination of the amount of parallelism. In other embodiments, throttle module 110 may make this determination using hardware logic within the processor and its cores. The determination may be made on a continuous basis or periodically.

Each time the throttle module 110 makes the determination of the amount of parallelism in the program, it may direct cores 120, 130, 140, 150 via signal lines 112, 114, 116, and 118 to change their voltage and clock frequency. In one embodiment, signal lines 112, 114, 116, and 118 may also be used to turn the cores on or off, or to remove power from a power well containing a core. In other embodiments, the cores may be turned off by clock gating or instruction starvation techniques. In one embodiment, if the current amount of thread level parallelism exceeds a previous amount by more than a threshold value, then the throttle module may initiate a transition to running a greater number of threads by decreasing the voltage and clock frequency in each core but running the threads on a greater number of cores. Cores that had previously been turned off may be turned on to support the larger number of threads. Similarly, if the current amount of thread level parallelism is less than a previous amount by more than a threshold value, then the throttle module may initiate a transition to running a fewer number of threads by increasing the voltage and clock frequency in some cores but running the threads on a fewer number of these cores. Some cores that had previously been turned on may be turned off as they may no longer be needed to support the smaller number of threads.

In one embodiment it may be possible to design a single-instruction-set-architecture (ISA) heterogeneous multi-core microprocessor in which different micro-architectures may be used to span a range of performance and power. In one embodiment, a chip-level multiprocessor may be built from two types of processor cores, which may be referred to as a large core and a small core. The two types of cores may implement the same instruction set architecture, use cache coherency to implement shared memory, and differ only in their micro-architecture. In other embodiments, the two types of core may implement similar instruction set architectures, or the small cores may implement a subset of the instruction set of the large cores. The large core may be an out-of-order, superscalar, deep pipeline machine, whereas the small core may be an in-order, scalar, short pipeline machine. The Intel Pentium 4 processor and Intel i486 processor are representative of the two classes of cores. In other embodiments, more than two classes or performance levels of cores running a substantially similar or identical instruction set architecture may be used.

In one embodiment, a chip-level multiprocessor includes one large core and 25 small cores, with the two types of cores having a 25:1 ratio in power consumption, a 5:1 ratio in scalar performance, and a 5:1 range of energy per instruction. The chip-level multiprocessor or this embodiment may operate as follows. In phases of low thread-level parallelism, the large core may be run for best scalar performance. In phases of high thread-level parallelism, multiple small cores may be run for best throughput performance.

At any instant in time, the microprocessor may run either one large core or 25 small cores. Because the number of available software threads will vary over time, the asymmetric multiprocessor should be capable of migrating a thread between large and small cores. A thread-migration logic may be implemented to support this function.

In practice, it may be desirable to allow a few small cores to run simultaneously with the large core in order to reduce the throughput performance discontinuity at the point of switching off the large core. In the previous example, a discontinuity of 3 units of throughput may result from switching off the large core and switching on two small cores. To reduce the percentage of the total throughput lost, the discontinuity may be moved to occur with a higher number of running threads by permitting, for example, up to 5 small cores to run simultaneously with the large core if the power supply will support this for a short period of time.

Using two types of cores representative of today's microprocessors, a 4:1 range of energy per instruction is achievable. As future microprocessors continue to deliver even higher levels of scalar performance, the range of possible energy per instruction may be expected to increase to perhaps 6:1, or well beyond this ratio.

Figure 2:
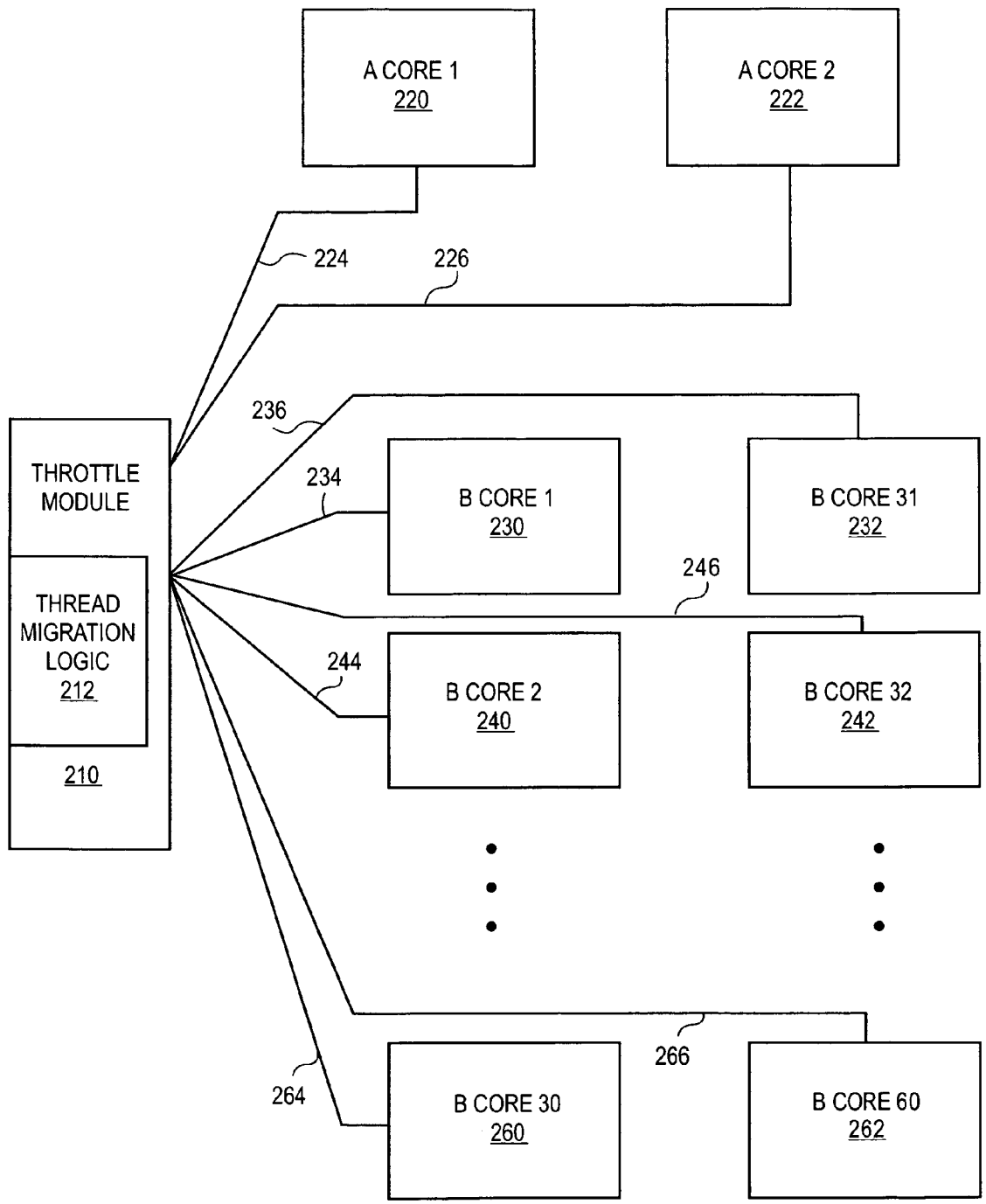
FIG. 2 is a schematic diagram of a processor including cores selectable by processing power and power consumption, according to one embodiment.

Referring now to FIG. 2, a schematic diagram of a processor including cores selectable by processing power and power consumption is shown, according to one embodiment. The processor may include a few larger cores, the A cores, and may also include a larger number of small cores, the B cores. The A core 1 220, A core 2 222, and B cores 1 through 60 230-262 are shown, but in other embodiments there may be more or fewer than two A cores and sixty B cores in a processor.

A throttle module 210 may again be used to gather information and make a determination about the amount of parallelism present in the executing software program. In one embodiment, the amount of parallelism may be the number of simultaneous threads supported. In other embodiments, other metrics may be used to express the amount of parallelism as discussed previously. Throttle module 210 may utilize information provided by the operating system to aid in the determination of the amount of parallelism. In other embodiments, throttle module 210 may make this determination using hardware logic within the processor and its cores. The determination may be made on a continuous basis or periodically.

Because the number of available software threads may vary over time, the processor of FIG. 1 may include a thread-migration logic 212 capable of migrating a thread between large A cores and small B cores. It may be desirable to allow a few small B cores to run simultaneously with the large A core in order to reduce the throughput performance discontinuity at the point of switching off the large A core. To reduce the percentage of the total throughput lost, the discontinuity may be moved to occur with a higher number of running threads by permitting, for example, up to 5 small cores to run simultaneously with the large core.

Each time the throttle module 210 makes the determination of the amount of parallelism in the program, it may initiate powering the A cores and B cores up or down using signal lines 224 through 266. In one embodiment, if the current amount of parallelism exceeds a previous amount by more than a threshold value, then the throttle module 210 may initiate, using thread-migration logic 212, a transition to running a greater number of threads which may be run on a greater number of B cores. B cores that had previously been turned off may be turned on to support the larger number of threads, and any A cores which are turned on may be turned off. Similarly, if the current amount of parallelism is less than a previous amount by more than a threshold value, then the throttle module may initiate a transition to running a fewer number of threads by running the threads on a fewer number of the A cores. B cores that had previously been turned on may be turned off as they may no longer be needed to support the smaller number of threads, and A cores may be turned on to support the smaller number of threads. As mentioned above, it may be desirable to allow a few B cores to run simultaneously with the A cores in order to reduce the throughput performance discontinuity at the point of switching off the large core.

In one embodiment, the throttle module may be implemented in a manner that does not require a feedback loop. Here the throttle's control action (e.g. determining which type and how many cores on which to run the threads) does not return to affect the input value (e.g. the allocation and configuration of cores for the threads). In this embodiment, it may be presumed that each A core 220, 222 may consume the same amount of power as 25 of the B cores 230 through 262. In other embodiments, differing ratios of power consumption may be used. The processor may divide its total power budget into two portions. For each portion, the power budget may permit either one A core and up to five B cores to operate at the same time, or no A cores and up to thirty B cores to operate at the same time. In other embodiments, the power budget may be divided into portions in other ways.

In one embodiment, the number of running threads (RT) may be allocated to a quantity of A cores (QAC) and a quantity of B cores (QBC) according to Table I.

TABLE I

| RT | QAC | QBC |
|---|---|---|
| 0 | 0 | 0 |
| 1 | 1 | 0 |
| 2 | 2 | 0 |
| 3 | 2 | 1 |
| 4 | 2 | 2 |
| ... | | |
| 10 | 2 | 8 |
| 11 | 2 | 9 |
| 12 | 2 | 10 |
| 13 | 1 | 12 |
| 14 | 1 | 13 |
| 15 | 1 | 14 |
| ... | | |
| 28 | 1 | 27 |
| 29 | 1 | 28 |
| 30 | 1 | 29 |
| 31 | 1 | 30 |
| 32 | 1 | 31 |
| 33 | 1 | 32 |
| 34 | 1 | 33 |
| 35 | 1 | 34 |
| 36 | 1 | 35 |
| 37 | 0 | 37 |
| 38 | 0 | 38 |
| 39 | 0 | 39 |
| 40 | 0 | 40 |
| ... | | |
| 60 | 0 | 60 |

When the number of running threads increases, and the new thread is started (in one embodiment via an interprocessor interrupt), the throttle module may determine the number of currently-running threads. Depending upon the number of currently-running threads, the new thread may be assigned to either an A core or a B core in accordance with Table I above. In this embodiment, for certain cases, such as when increasing from 12 threads to 13 threads, or from 36 threads to 37 threads, an existing thread running on an A core would be migrated to running on a B core. When this migration is complete, both the existing migrated thread and the new thread may be started. For this reason, in this embodiment the new thread may exhibit a delay in starting.

A similar process may occur when the number of running threads decreases. When a particular thread terminates, and its core is halted, various methods may be used to potentially migrate one of the remaining threads from running on a B core to running on an A core. This could occur, for example, when reducing the number of running thread from 13 threads to 12 threads, or from 37 threads to 36 threads. In one embodiment, a periodic timer may be used to permit the migration only once in a particular time interval. This may advantageously prevent too frequent thread migrations in cases where threads are rapidly created and terminated. The affected thread could remain running on the B core for up to the particular time interval.

In one embodiment, the throttle module may perform the migrations from A cores to B cores transparently to the software. The thread migration mechanism of the throttle module may include a table for mapping logical cores to physical cores, an interrupt to signal a core migration may be needed, microcode or hardwired logic to copy the core's processor state, and an interconnect network between the processor's cores. The number of logical cores may be equal to the number of B cores.

In another embodiment, the throttle module may perform the migrations from A cores to B cores in a manner not transparent to the software. The thread migration may be performed by the operating system scheduler. The operating system may track the number of cores with currently running threads, assign new threads to cores, and migrate threads from A cores to B cores (or B cores to A cores). The software thread migration may use equivalent functions to those described above in regards the hardware implementation. In one embodiment, the throttle module operation may be transparent to application programs although not to the operating system.

One alternate way to modulate power consumption may be to adjust the size or functionality of logic blocks. For example, variable-sized schedulers, caches, translation lookaside buffers (TLBs), branch predictors, and other optional performance circuits may be used to reduce switching capacitance (and hence energy) when large array sizes are not needed. In addition to dynamically resizing arrays, it is also possible to design a large core that degrades its performance into that of a smaller core by dynamically disabling execution units, pipeline stages, and other optional performance circuits. These techniques may be collectively known as adaptive processing.

One embodiment of a chip-level multiprocessor may operate as follows. In phases of low thread parallelism, a few cores could be run using a first set (for example, all or many) of the available optional performance circuits on each core for good scalar performance. In phases of high thread parallelism, many cores could be operated using fewer optional performance circuits on each core for good throughput performance.

The net result of reducing array sizes and disabling execution units may be to reduce the capacitance toggled per instruction. However, switching capacitance might not be reduced by as much as designing a smaller core to begin with. While unused execution hardware may be gated off, the physical size of the core does not change, and thus the wire lengths associated with the still active hardware blocks may remain longer than in a small core.

An estimate of the possible reduction in energy per instruction may be made by examining the floorplan of a large out-of-order microprocessor and determining how many optional performance circuits may be turned off to convert the processor into a small in-order machine (keeping in mind that the blocks cannot be physically moved). The percentage of processor core area turned off may then be quantified, which may approximate the reduction in switching capacitance. From equation (2), energy per instruction is roughly proportional to the amount of switching capacitance.

A rough estimate is that in some cases up to 50% of the switching capacitance may be turned off, resulting in a 1× to 2× reduction in energy per instruction. In some embodiments, the use of leakage control techniques such as dynamic sleep transistors and body bias in addition to clock gating may facilitate reducing the energy consumed per instruction.

Figure 3:
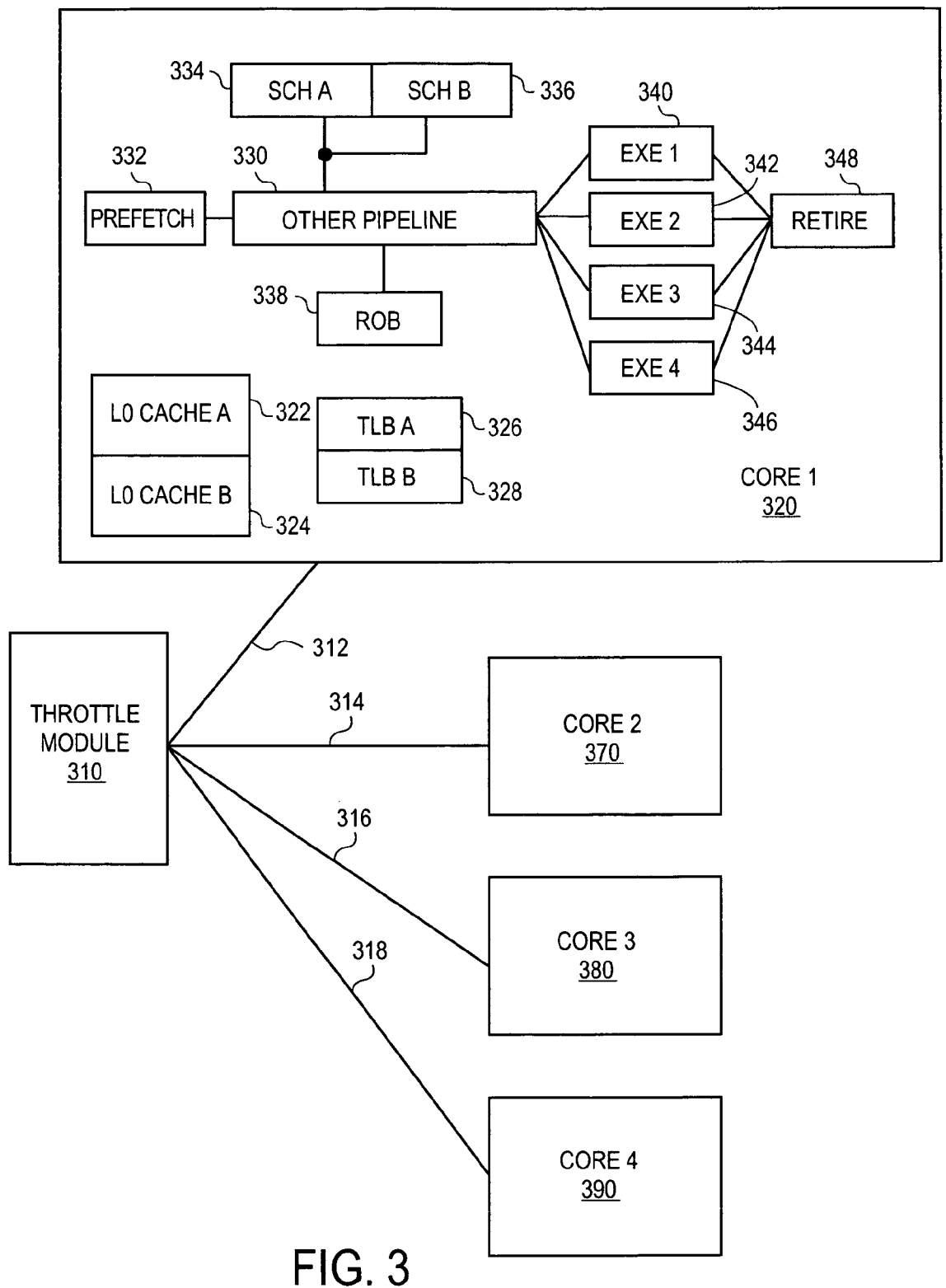
FIG. 3 is a schematic diagram of a processor including cores configurable by optional performance circuits, according to one embodiment.

Referring now to FIG. 3, a schematic diagram of a processor including cores configurable by optional performance circuits is shown, according to one embodiment. The FIG. 3 processor may include four cores, core 1 320, core 2 370, core 3 380, and core 4 390. In other embodiments, more or fewer than four cores may be used. Core 1 320 shows various optional performance circuits. Scheduler A 334 may be coupled to an optional scheduler B 336 which may enhance performance when turned on. Execution unit 1 340 may be coupled to optional execution units 2 through 4 342, 344, 346 which may enhance performance when turned on. Level zero (L0) cache A 322 may be coupled to L0 cache B 324 which may enhance performance when turned on. TLB A 326 may be coupled to TLB B 328 which may enhance performance when turned on. A reorder buffer (ROB) 338 may have a variable number of lines, or may be turned off altogether to inhibit out-of-order execution. Finally a prefetch stage 332, separate from other pipeline stages 330, may perform speculative fetches when powered on. In other embodiments, other optional performance circuits may be used.

A throttle module 310 again may be used to gather information and make a determination about the amount of parallelism present in the executing software program. The throttle module 310 may be similar to those discussed above in connection with FIGS. 1 and 2. Each time the throttle module 310 makes the determination of the amount of parallelism in the program, it may direct cores 320, 370, 380, and 390 via signal lines 312, 314, 316, and 318 to change the number of optional performance circuits that are powered up or down. In one embodiment, signal lines 312, 314, 316, and 318 may also be used to turn the cores 320, 370, 380, and 390 on or off. In one embodiment, if the current amount of parallelism exceeds a previous amount by more than a threshold value, then the throttle module may initiate a transition to running a greater number of threads by decreasing the optional performance circuits turned on in each core but running the threads on a greater number of these cores. Cores that had previously been turned off may be turned on to support the larger number of threads. Similarly, if the current amount of parallelism is less than a previous amount by more than a threshold value, then the throttle module may initiate a transition to running a fewer number of threads by increasing the optional performance circuits turned on in some cores but running the threads on a fewer number of these cores. Some cores that had previously been turned on may be turned off as they may no longer be needed to support the smaller number of threads.

Various forms of speculation control have been proposed to reduce energy wasted due to misspeculated instructions, for example, instructions following a mispredicted branch. The additional energy results from capacitance toggled to process a misspeculated instruction. While the results of the misspeculated instruction may be discarded, the energy has already been spent. This energy may be accounted for by charging it to the next correctly-speculated (retired) instruction.

Pipeline gating is a technique to avoid filing the pipeline with instructions that are likely to be discarded due to one or more low-confidence branch predictions. In one embodiment using speculation control, a chip-level multiprocessor may operate as follows. In phases of low thread parallelism, a few cores may be run using an increased amount of speculation for good scalar performance. In phases of high thread parallelism, many cores may be run using a decreased amount of speculation on each core for good throughput performance.

There exists some overlap between the variable-size core technique and speculation control because reducing the number of scheduler and reorder buffer entries also reduces the number of instructions that may be speculated. The size of other processor resources such as caches, TLBs, and branch predictors may not have as great an effect on the amount of speculation possible.

Figure 4:
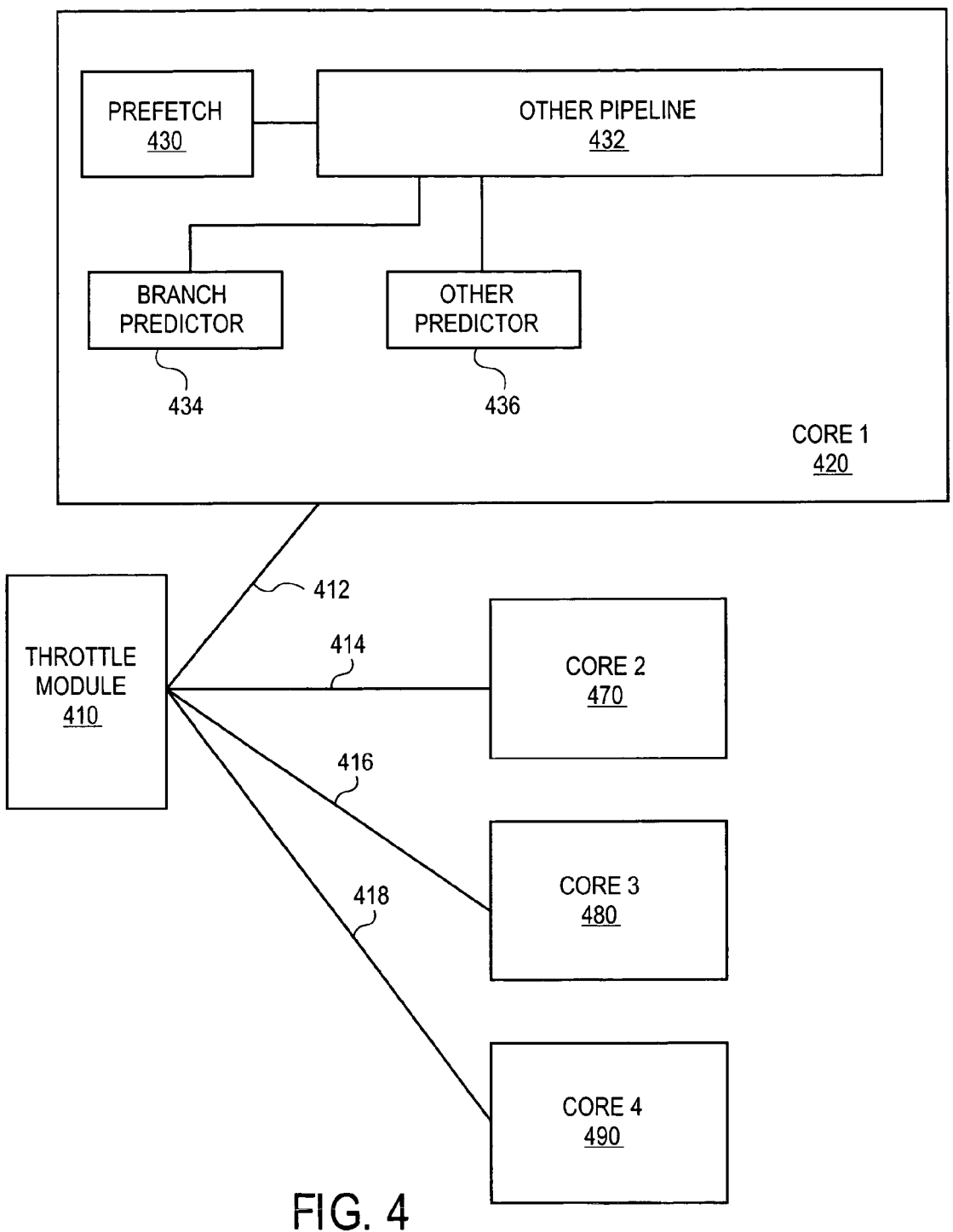
FIG. 4 is a schematic diagram of a processor including cores configurable by optional speculative circuits, according to one embodiment of the present disclosure.

Referring now to FIG. 4, a schematic diagram of a processor including cores configurable by optional speculative circuits is shown, according to one embodiment of the present disclosure. The FIG. 4 processor may include four cores, core 1 420, core 2 470, core 3 480, and core 4 490. In other embodiments, more or fewer than four cores may be used. Core 1 420 shows various optional speculative circuits. A prefetch stage 430 may be used to speculatively fetch instructions. A branch predictor 434 may be used to support speculative execution of program branches. Other predictor 436 may in some embodiments be a loop predictor or other form of predictor to support other forms of speculative execution. In other embodiments, further optional speculative circuits may be used.

A throttle module 410 again may be used to gather information and make a determination about the amount of parallelism present in the executing software program. The throttle module 410 may operate generally as discussed above in connection with FIGS. 1, 2, and 3. Each time the throttle module 410 makes the determination of the amount of parallelism in the program, it may direct cores 420, 470,480, and 490 via signal lines 412,414,416, and 418 to change the number of optional speculative circuits that are powered up or down. In one embodiment, signal lines 412, 414, 416, and 418 may also be used to turn the cores 420, 470, 480, and 490 on or off. In one embodiment, if the current amount of parallelism exceeds a previous amount by more than a threshold value, then the throttle module may initiate a transition to running a greater number of threads by decreasing the optional speculative circuits turned on in each core but running the threads on a greater number of these cores. Cores that had previously been turned off may be turned on to support the larger number of threads. Similarly, if the current amount of parallelism is less than a previous amount by more than a threshold value, then the throttle module may initiate a transition to running a fewer number of threads by increasing the optional speculative circuits turned on in some cores but running the threads on a fewer number of these cores. Some cores that had previously been turned on may be turned off as they may no longer be needed to support the smaller number of threads.

For each of the techniques discussed above in connection with FIGS. 1, 2, 3, and 4, a throttle module may regulate the operation of the multiprocessor to maintain total chip power within a fixed power budget. The throttle module hardware may satisfy Equation (3) by varying the amount of energy per instruction in inverse proportion to the aggregate number of instructions retired per second. In response to an over power situation, in several embodiments the throttle module may take one or more of the following actions: lower the voltage and frequency (in the FIG. 1 case of voltage and frequency scaling), migrate the threads from large cores to small cores (in the FIG. 2 case of asymmetric cores), reduce the capacity of optional performance circuitry (in the FIG. 3 case of variable-size cores), or reduce the amount of speculation (in the FIG. 4 case of speculation control).

In each case, the software program may view the processor as a large symmetrical chip-level multiprocessor, albeit with the unusual property that existing threads become slower as the software asks hardware to run more threads simultaneously, even though net throughput increases. With this approach, software written for today's shared-memory multiprocessor programming model may continue to run without modification.

Figure 5:
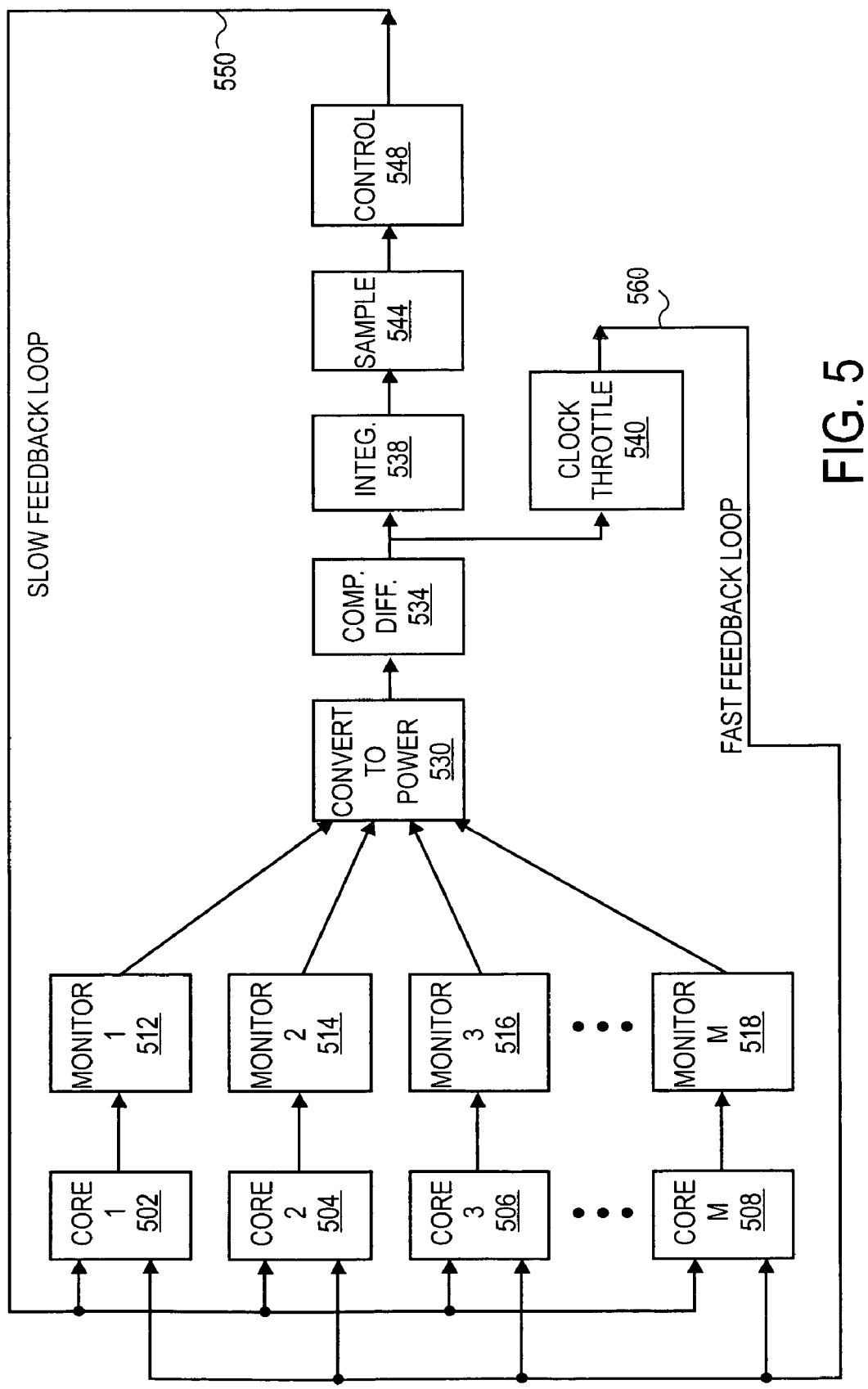
FIG. 5 is schematic diagram of a processor including cores and details of a throttle, according to one embodiment of the present disclosure.

Referring now to FIG. 5, a schematic diagram of a processor including cores and details of a throttle module is shown, according to one embodiment of the present disclosure. The quantity M processor cores 1 through M, 502 through 508, may in several embodiments be the cores of FIG. 1 configurable by voltage and frequency, the large and small cores of FIG. 2 that vary in processing power and power consumption, the cores of FIG. 3 configurable by optional performance circuits, the cores of FIG. 4 configurable by optional speculative circuits, or a mixture of some or all of these types. In other embodiments, other types of cores may be used.

Monitors 1 through M, 512 through 518, may monitor one or more attributes of the associated core and ancillary processor circuitry. In some embodiments these attributes may include whether the core is running or halted, the instantaneous number of instructions retired per clock cycle, whether a given functional block of a core is active or idle, whether a given functional block of the processor other than those within the cores is active or idle, and the supply current and temperature of the core (or die temperature). Functional blocks of the processor other than those within cores may include circuits such as shared caches or memory controllers. The supply current may be measured via a current sensor resistor and analog-to-digital (A/D) converter. The temperature may be measured via a thermal diode and A/D converter. The output of each monitor 1 through M, 512 through 518 may be the monitored value of all or some portion of these attributes.

A convert-to-power logic 530 may receive the monitored value or values from the monitor 1 through M, 512 through 518. In various embodiments, the monitored values may be converted into a measure of power consumption. In an embodiment where the monitored value reflects whether the core is running or halted, the monitored value may be converted into power consumption by multiplying the core running (or halted) state by the average amount of energy expended per clock while the core is in the running (or halted) state. These products may then be summed for all cores in the processor. In an embodiment where the monitored value reflects the instantaneous number of instructions retired per clock cycle, the monitored value may be converted into power consumption by multiplying the number of instructions by the average amount of energy expended per instruction per clock. These products may then be summed for all cores in the processor. In an embodiment where the monitored value reflects whether a given functional block of a core is active or idle (or in some embodiments whether a given functional block of the processor other than within the cores is active or idle), the monitored value may be converted into power consumption by multiplying the active (or idle) state by the average amount of energy expended per clock while the block is in the active (or idle) state. These products may then be summed for all blocks in each core, and for all cores in the processor. When blocks not within the cores are considered, the products may be included in the summation. In each of these embodiments, the resulting sum may be adjusted for voltage and frequency by multiplying by a value proportional to the clock frequency multiplied by the square of the supply voltage.

In an embodiment where the monitored value reflects the supply current of each core, the monitored value may be converted into power consumption by multiplying the supply currents by the supply voltage.

In an embodiment where the monitored value reflects the core or die temperature, the circuits of FIG. 5 may be used to maintain a nearly-constant core or die temperature, instead of maintaining a nearly-constant power consumption.

A compute-difference logic 534 may be used to compute the difference between the converted power consumption (or die temperature) output of convert-to-power logic 530 and a desired power consumption value (or desired die temperature value). The difference may be used as an "error" value.

An integrate logic 538 may in one embodiment provide an integrated value proportional to the integral over time of the error value supplied by compute-difference logic 534. In one embodiment, the integral may be computed by using an accumulator, which may be implemented using an adder and a register. The accumulator may be saturated on both upper and lower bounds to avoid overflow. In one embodiment, the accumulator output may be a fixed-point binary number with, for example, 2 to 6 integer bits and from 2 to 16 fractional bits. It is possible to examine the most-significant bits of the accumulator, which may advantageously yield the property of having the output change slowly. The use of integrate logic 538 may help the slow feedback loop 550 to aim to reduce the error values to zero over time. The use of integrate logic 538 may be most advantageous when the error value is power, because the instantaneous power consumption may change substantially from clock cycle to clock cycle.

In other embodiments, integrate logic 538 may be replaced by logic to yield a value proportional to the error value, which may be advantageous when the error value is temperature. In another embodiment, the logic may yield a value proportional to the time derivative of the error value, or some linear combination of all of the above values.

A sample logic 544 may be used in certain embodiments. The integrated value from integrate logic 538 may change with each clock cycle, even though in the abstract the integrated value may change slowly relative to the speed of the FIG. 5 logic. Some control techniques may vary their action each clock cycle with little system cost. In this case sampling may not be needed. In other control techniques, it may be advantageous to use sampling to help reduce oscillating values with each clock when the output of integrate logic 538 is near to a transition point.

In one embodiment, a fixed sampling technique may be used in sample logic 544. The value may be sampled once every fixed number N clock cycles. This may inhibit the value from changing more rapidly than once every N clock cycles. However, this technique may not permit control from being exercised for time periods less than N clock cycles, and may work best when the integration is slow when compared to a time period of N clock cycles.

In another embodiment, a hysteresis technique may be used in sample logic 544. The output of sample logic 544 may change only when the difference between the input and output values exceeds a threshold value T. The output value may be replaced with the input value when the difference exceeds T, otherwise the output value may remain unchanged.

For embodiments using the slow feedback loop 550, a control logic 548 may be used. In one embodiment, such as that of FIG. 1, where the cores may vary power consumption by changing supply voltage and frequency, control logic 548 may direct the changing of supply voltage and frequency. In these embodiments it should be noted that changing the power supply voltage may take a relatively long time, such as 100 microseconds. In one embodiment, a table or logic block may be used to set the power supply voltage and frequency. Table II gives one example of such a table or logic block for various values of control value (CV).

TABLE II

| CV | Volt. | Freq. (GHz) |
|---|---|---|
| 0 | 1.4 | 4 |
| 1 | 1.4 | 4 |
| 2 | 1.4 | 4 |
| 3 | 1.2 | 3.3 |
| 4 | 1.1 | 2.9 |
| 5 | 1.0 | 2.5 |
| 6 | 1.0 | 2.5 |
| 7 | 0.9 | 2.2 |

In one embodiment, such as that of FIG. 2, where the threads may be allocated to large cores and small cores, control logic 948 may allocate the threads to cores and migrate the threads according to the control value transparently to the software. The thread migration mechanism may include a table or logic block for mapping "logical" processor cores to "physical" processor cores. The thread migration mechanism may also include an interrupt to signal that a migration is requested, microcode or equivalent logic to copy the processor state, and an interconnect network between the various processor cores. The number of logical processors seen by the software may be equal to the number of small cores running. The large cores may be substituted for the small cores when the power budget permits. The table or logic block used to budget such use of large cores as a function of the control value may in one embodiment be that given in Table III.

TABLE III

| CV | Qty. Large Cores |
|---|---|
| 0 | 2 |
| 1 | 1 |
| 2 | 0 |

Here a simplifying assumption may be made that a thread will be run on a small core when a large core may not be used.

In one embodiment, such as that of FIG. 3, where the threads may be allocated to cores whose resources are capable of being dynamically varied, control logic 548 may give a control value that may change the quantity or capacity of the functional units of the cores. In some embodiments, where varying the capacity of a core may require that arrays be filled or written back, or the pipeline to be refilled, the time used for the changes may be in the range of 10 microseconds. A table or logic block may be used to budget the use of the core functional units as a function of the control value. The table or logic block used to budget such use of functional units as a function of the control value may in one embodiment be that given in Table IV, where the functional units may be the execution units in the core.

TABLE IV

| CV | Exe. Units |
|---|---|
| 0 | 4 |
| 1 | 4 |
| 2 | 4 |
| 3 | 2 |
| 4 | 2 |
| 5 | 1 |
| 6 | 1 |
| 7 | 1 |
| 8 | 1 |

In one embodiment, such as that of FIG. 4, where the threads may be allocated to cores whose amount of speculation is capable of being dynamically varied, control logic 548 may give a control value that may change the amount of speculation permitted in the cores. A table or logic block may be used to budget the use of the amount of speculation in the core as a function of the control value. The table or logic block used to adjust the amount of speculation as a function of the control value may in one embodiment be that given in Table V, where the amount of speculation may be given by the number of instructions to speculatively execute in advance of the non-speculative instructions in the core.

TABLE V

| CV | Spec. Instructions |
|---|---|
| 0 | 128 |
| 1 | 128 |
| 2 | 128 |
| 3 | 85 |
| 4 | 64 |
| 5 | 51 |
| 6 | 42 |
| 7 | 36 |
| 8 | 32 |

In many embodiments, the processor cores may include several of the above attributes. For example, a processor may have cores capable of voltage and frequency scaling, and also adjustable amounts of speculative execution. In one embodiment, the large A cores and smaller B cores of FIG. 2 may also have voltage and frequency scaling as shown in FIG. 1. For one embodiment, voltage and frequency may be fixed, with the large A cores being configured to run at higher voltage and the smaller B cores being configured to run at lower voltage. In another embodiment, the range of adjustment of voltage and frequency may be different between the large A cores and the smaller B cores. To assist in the migration between the large A cores and the smaller B cores, a thread may be migrated from a large A core to a smaller B core, where the smaller B core initially is running at a higher voltage and frequency. The voltage and frequency of that B core may subsequently be lowered once the larger A cores are not running.

Once again, a table or logic block may be used to allocate threads to large A cores or smaller B cores, and further to the voltage and frequency of the cores. The table or logic block used to make these adjustments as a function of the control value may in one embodiment be that given in Table VI.

TABLE VI

| CV | Qty. Large Cores | Voltage | Freq. |
|---|---|---|---|
| 0 | 2 | 1.4 | 4 |
| 1 | 2 | 1.4 | 4 |
| 2 | 1 | 1.4 | 4 |
| 3 | 1 | 1.4 | 4 |
| 4 | 0 | 1.4 | 4 |
| 5 | 0 | 1.2 | 3.3 |
| 6 | 0 | 1.1 | 2.9 |
| 7 | 0 | 1.0 | 2.5 |
| 8 | 0 | 1.0 | 2.5 |
| 9 | 0 | 0.9 | 2.2 |

It may be advantageous to maintain somewhat constant gain around the slow feedback loop 550, which may be accomplished by making similar in size the power effects of each gradation in such a table or logic block.

In certain embodiments, a fast feedback loop 560 may be used in conjunction with the slow feedback loop 550 previously discussed. In one embodiment, a clock throttle 540 may be used, even though clock throttling may not affect the amount of energy per instruction. The use of clock throttle 540 may be advantageous when used in combination with one or more of the slow feedback loop 550 techniques discussed above.

In certain cases, the fast feedback loop 560 may be applied with a short latency to inhibit over-power situations, and the application may remain in effect only until the slow feedback loop 550 has had time to respond. In embodiments where the fast feedback loop 960 is not implemented, the processor and its power delivery system should be designed to handle over-power situations lasting as long as the response time of the slow feedback loop 550. When fast feedback loop 560 is added, the over-power situation may not last longer than the response time of the fast feedback loop 560, which may be in the range of 10 nanoseconds.

The clock throttle 540 may operate to gate the core clock on and off with a certain duty cycle, using as its input the error value computed in compute-difference logic 534. In one simple embodiment, when the error value exceeds a fixed threshold, the clock may be stopped for a given number of cycles. This computation may be made at each clock cycle and may be fully pipelined. The given number of cycles may be chosen to limit the power to somewhat more than the desired power (which may permit the slow feedback loop 550 to respond), but not greater than the maximum power.

In another embodiment, clock throttle 550 may modulate the duty cycle responsive to the size of the error value supplied by compute-difference logic 535 (e.g. how much over the power threshold the processor is currently running). In one embodiment, the duty cycle and error value may be related as in Table VII.

TABLE VII

| Error Value | Duty cycle |
|---|---|
| −2 | 100% |
| −1 | 100% |
| 0 | 100% |
| 1 | 100% |
| 2 | 100% |
| 3 | 100% |
| 4 | 100% |
| 5 | 100% |
| 6 | 100% |
| 7 | 100% |

TABLE VII-continued

| Error Value | Duty cycle |
| --- | --- |
| 8 | 94% |
| 9 | 88% |
| 10 | 81% |
| 11 | 75% |
| 12 | 69% |
| 13 | 63% |
| 14 | 56% |
| 15 | 50% |

Figure 6:
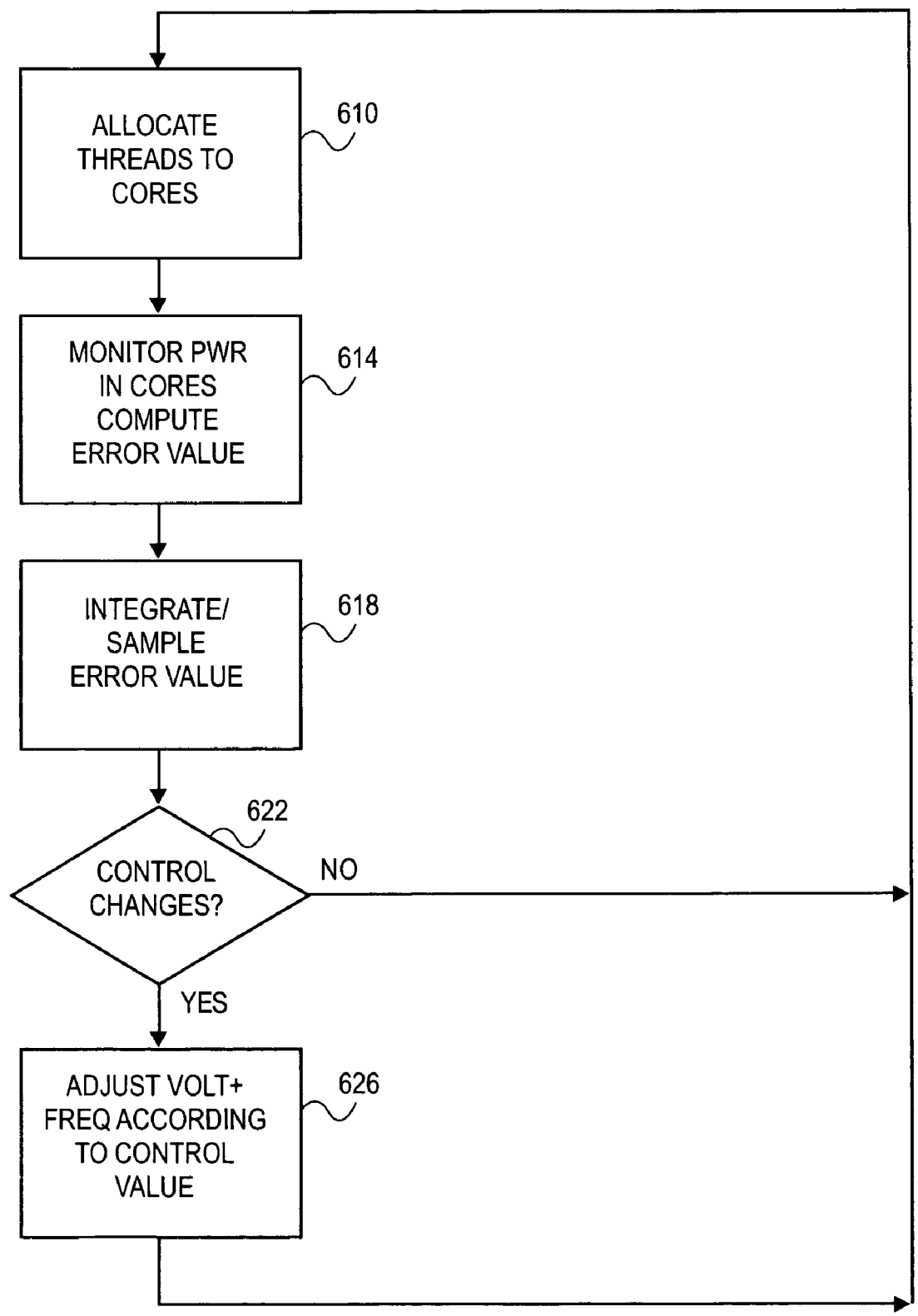
FIG. 6 is a flowchart showing transitioning to differing core configurations, according to one embodiment of the present disclosure.

Referring now to FIG. 6, a flowchart showing transitioning to differing core configurations is shown, according to one embodiment of the present disclosure. The process begins at block 610, which may include allocating various software threads to available cores. In one embodiment, the number of threads is determined, and each thread is allocated to a core. In some embodiments this determination may be made by software, such as an operating system. In other embodiments, this determination may be made by hardware logic, or by a combination of hardware and software. In block 614, the amount of power consumed by each core is monitored, and an error value is calculated between the observed power consumption and a desired power consumption. In various embodiment, any of the monitoring techniques discussed above in connection with FIG. 5 may be used. Then in block 618, the error value of block 614 may be subjected to integration or sampling techniques, or both, as described above in connection with FIG. 5. In some embodiments, block 618 may be optional. The output of block 618 may be a control value that may inhibit core configuration changes until the error value during a time period may be determined to be substantial enough to warrant the performance penalty of changing the configuration of the cores.

In decision block 622, the determination may be made whether the error value during time is sufficient to warrant changing the configuration of the cores. If the difference is not sufficient, then the process may exit decision block 622 out the NO path and the process repeats. However, if the difference is sufficient, then the process may exit decision block 622 out the YES path.

In block 626, the voltage and frequency may be changed in accordance with the control values. In one embodiment, the voltages and frequencies may be changed for the control values as shown above in Table II. In one embodiment, the voltages and frequencies of the various cores may all be changed alike. In other embodiments, the voltages and frequencies may be changed differently on the various cores. In any case the process repeats at block 610.

Figure 7:
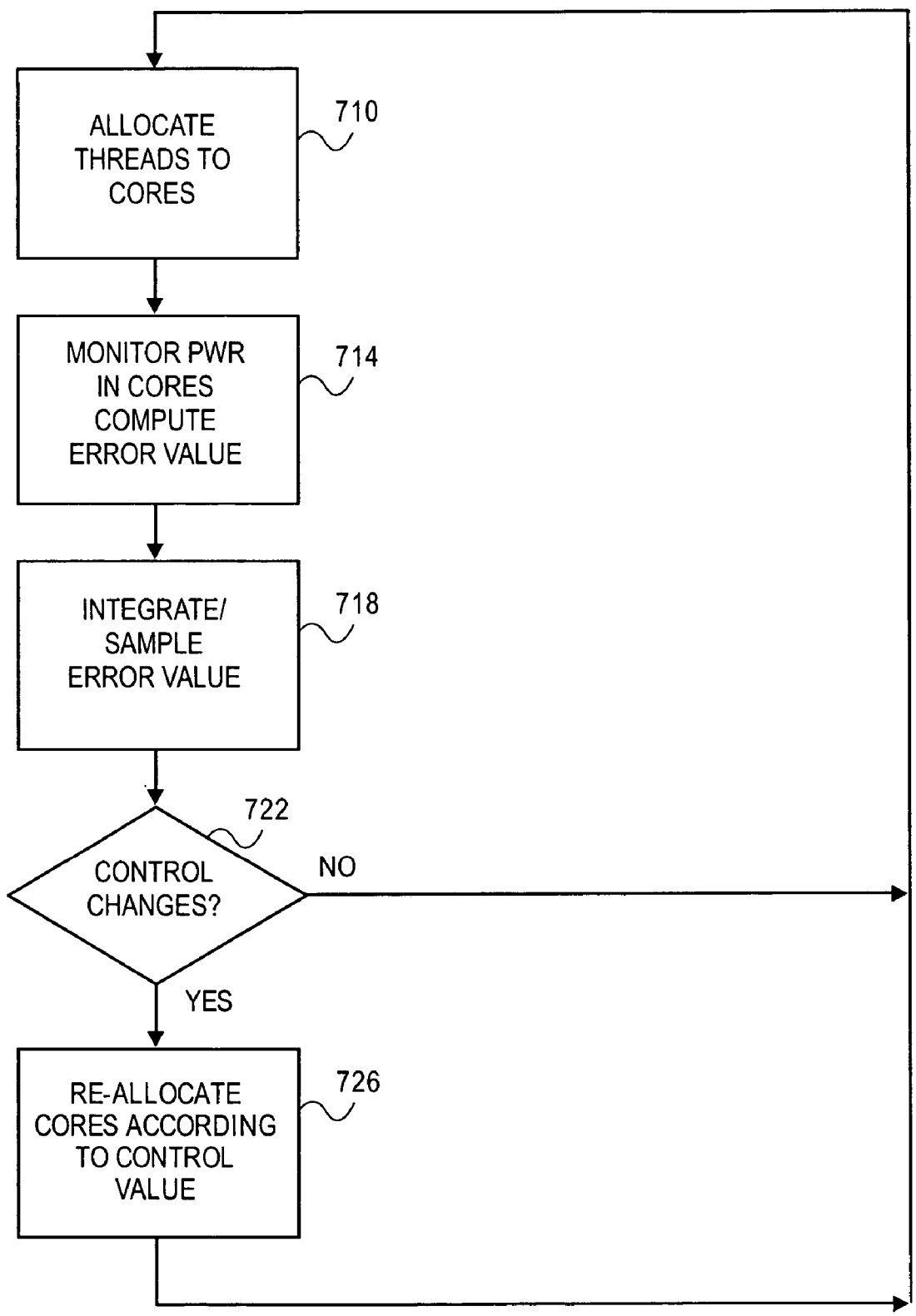
FIG. 7 is a flowchart showing transitioning to differing core configurations, according to another embodiment of the present disclosure.

Referring now to FIG. 7, a flowchart showing transitioning to differing core configurations is shown, according to one embodiment of the present disclosure. The process begins at block 710, which may include allocating various software threads to available cores. In one embodiment, the number of threads is determined, and each thread is allocated to a core. In some embodiments this determination may be made by software, such as an operating system. In other embodiments, this determination may be made by hardware logic, or by a combination of hardware and software. In block 714, the amount of power consumed by each core is monitored, and an error value is calculated between the observed power consumption and a desired power consumption. In various embodiment, any of the monitoring techniques discussed above in connection with FIG. 5 may be used. Then in block 718, the error value of block 714 may be subjected to integration or sampling techniques, or both, as described above in connection with FIG. 5. In some embodiments, block 718 may be optional. The output of block 718 may be a control value that may inhibit core configuration changes until the error value during a time period may be determined to be substantial enough to warrant the performance penalty of changing the configuration of the cores.

In decision block 722, the determination may be made whether the error value during time is sufficient to warrant changing the configuration of the cores. If the difference is not sufficient, then the process may exit decision block 722 out the NO path and the process repeats. However, if the difference is sufficient, then the process may exit decision block 722 out the YES path.

In block 726, the threads may be re-allocated among the cores according to the control value. In one embodiment, the threads may be re-allocated to a particular number of large cores for the control values as shown above in Table III. In one embodiment, the number of large cores is given as in Table III, and threads that may not run on a large core may be re-allocated to a small core. In other embodiments, other schemes for re-allocating threads to cores may be used. In any case the process repeats at block 710.

Figure 8:
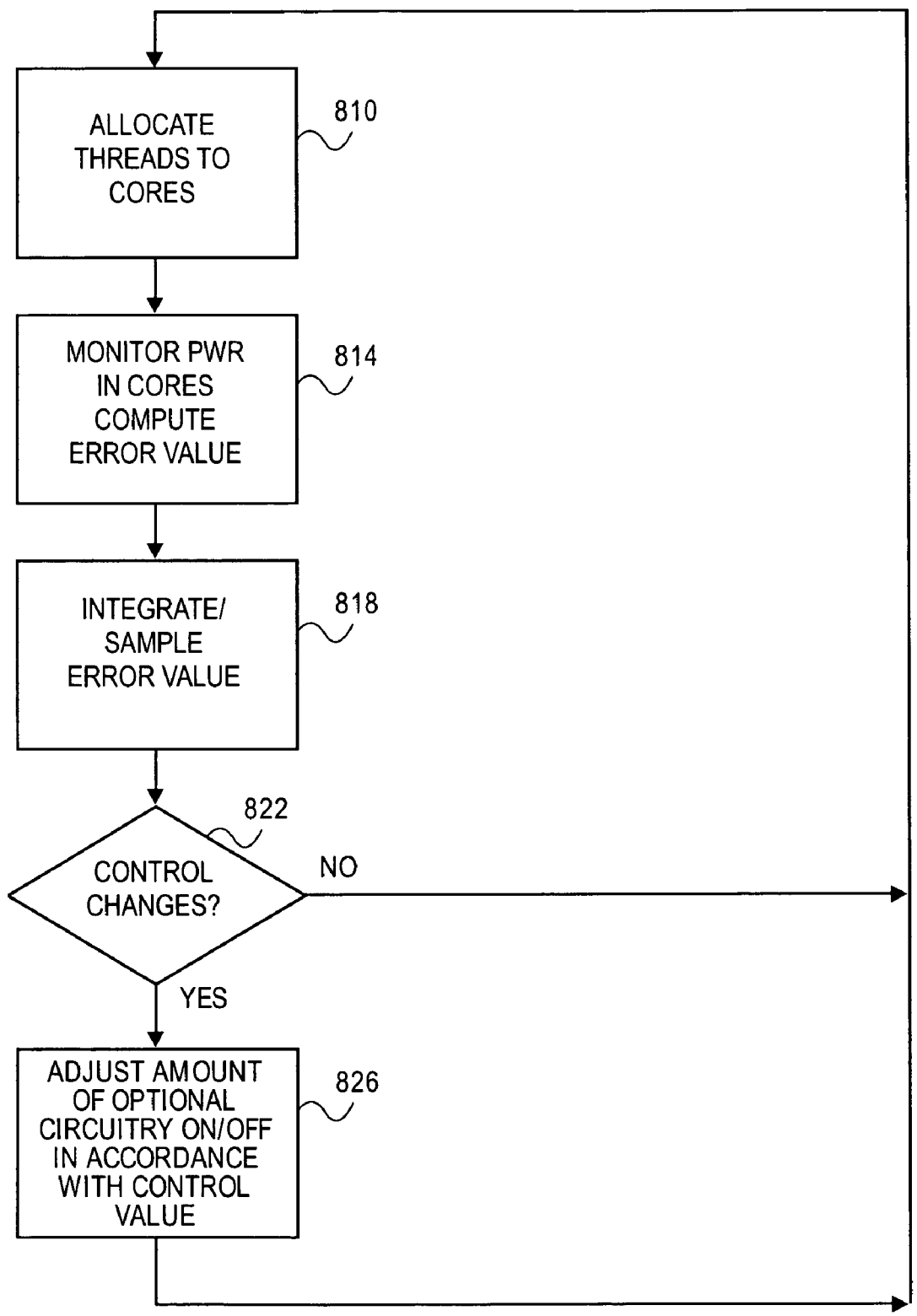
FIG. 8 is a flowchart showing transitioning to differing core configurations, according to another embodiment of the present disclosure.

Referring now to FIG. 8, a flowchart showing transitioning to differing core configurations is shown, according to one embodiment of the present disclosure. The process begins at block 810, which may include allocating various software threads to available cores. In one embodiment, the number of threads is determined, and each thread is allocated to a core. In some embodiments this determination may be made by software, such as an operating system. In other embodiments, this determination may be made by hardware logic, or by a combination of hardware and software. In block 814, the amount of power consumed by each core is monitored, and an error value is calculated between the observed power consumption and a desired power consumption. In various embodiment, any of the monitoring techniques discussed above in connection with FIG. 5 may be used. Then in block 818, the error value of block 814 may be subjected to integration or sampling techniques, or both, as described above in connection with FIG. 5. In some embodiments, block 818 may be optional. The output of block 818 may be a control value that may inhibit core configuration changes until the error value during a time period may be determined to be substantial enough to warrant the performance penalty of changing the configuration of the cores.

In decision block 822, the determination may be made whether the error value during time is sufficient to warrant changing the configuration of the cores. If the difference is not sufficient, then the process may exit decision block 822 out the NO path and the process repeats. However, if the difference is sufficient, then the process may exit decision block 822 out the YES path.

In block 826, the amount of optional circuitry in the cores may be turned on or off in accordance with the control value as given above in Table IV. In one embodiment, the number of execution units powered on or off may be changed for the control values as shown above in Table IV. In other embodiments, other optional performance circuits may be turned on and off according to a control value. These other optional performance circuits may include schedulers, caches, translation look-aside buffers, schedulers, and re-order buffers. In any case the process repeats at block 810.

Figure 9:
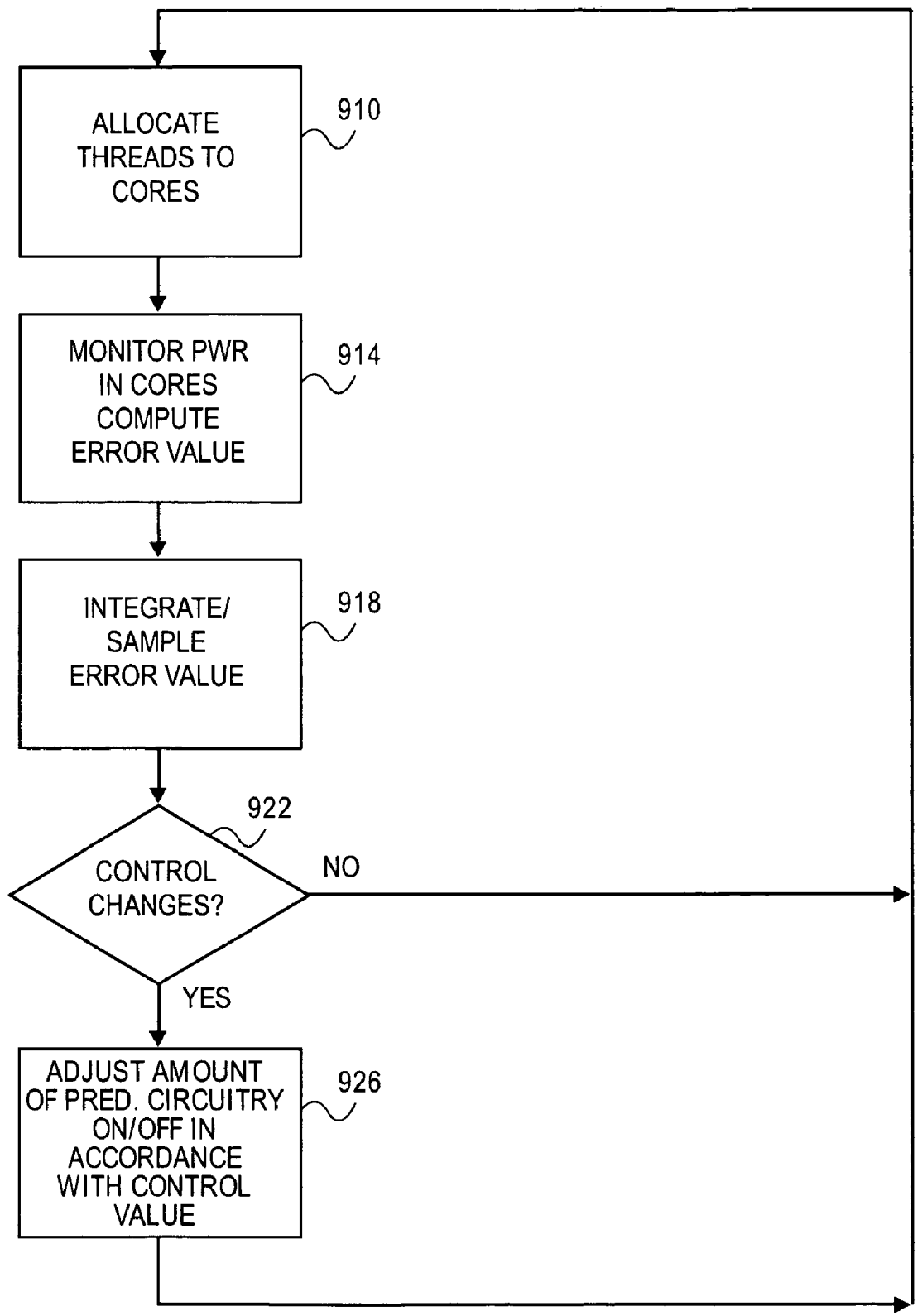
FIG. 9 is a flowchart showing transitioning to differing core configurations, according to another embodiment of the present disclosure.

Referring now to FIG. 9, a flowchart showing transitioning to differing core configurations is shown, according to one embodiment of the present disclosure. The process begins at block 910, which may include allocating various software threads to available cores. In one embodiment, the number of threads is determined, and each thread is allocated to a core. In some embodiments this determination may be made by software, such as an operating system. In other embodiments, this determination may be made by hardware logic, or by a combination of hardware and software. In block 914, the amount of power consumed by each core is monitored, and an error value is calculated between the observed power consumption and a desired power consumption. In various embodiment, any of the monitoring techniques discussed above in connection with FIG. 5 may be used. Then in block 918, the error value of block 914 may be subjected to integration or sampling techniques, or both, as described above in connection with FIG. 5. In some embodiments, block 918 may be optional. The output of block 918 may be a control value that may inhibit core configuration changes until the error value during a time period may be determined to be substantial enough to warrant the performance penalty of changing the configuration of the cores.

In decision block 922, the determination may be made whether the error value during time is sufficient to warrant changing the configuration of the cores. If the difference is not sufficient, then the process may exit decision block 922 out the NO path and the process repeats. However, if the difference is sufficient, then the process may exit decision block 922 out the YES path.

In block 926, the amount of speculation in the cores may be varied in accordance with the control value as given above in Table V. In one embodiment, the number of instructions executed speculatively may be changed for the control values as shown above in Table V. In other embodiments, other methods may be used to vary the amount of speculation according to a control value. These other methods to vary the amount of speculation may include powering on or off a prefetch unit, a branch predictor, or another form of predictor. In any case the process repeats at block 910.

Figure 10A:
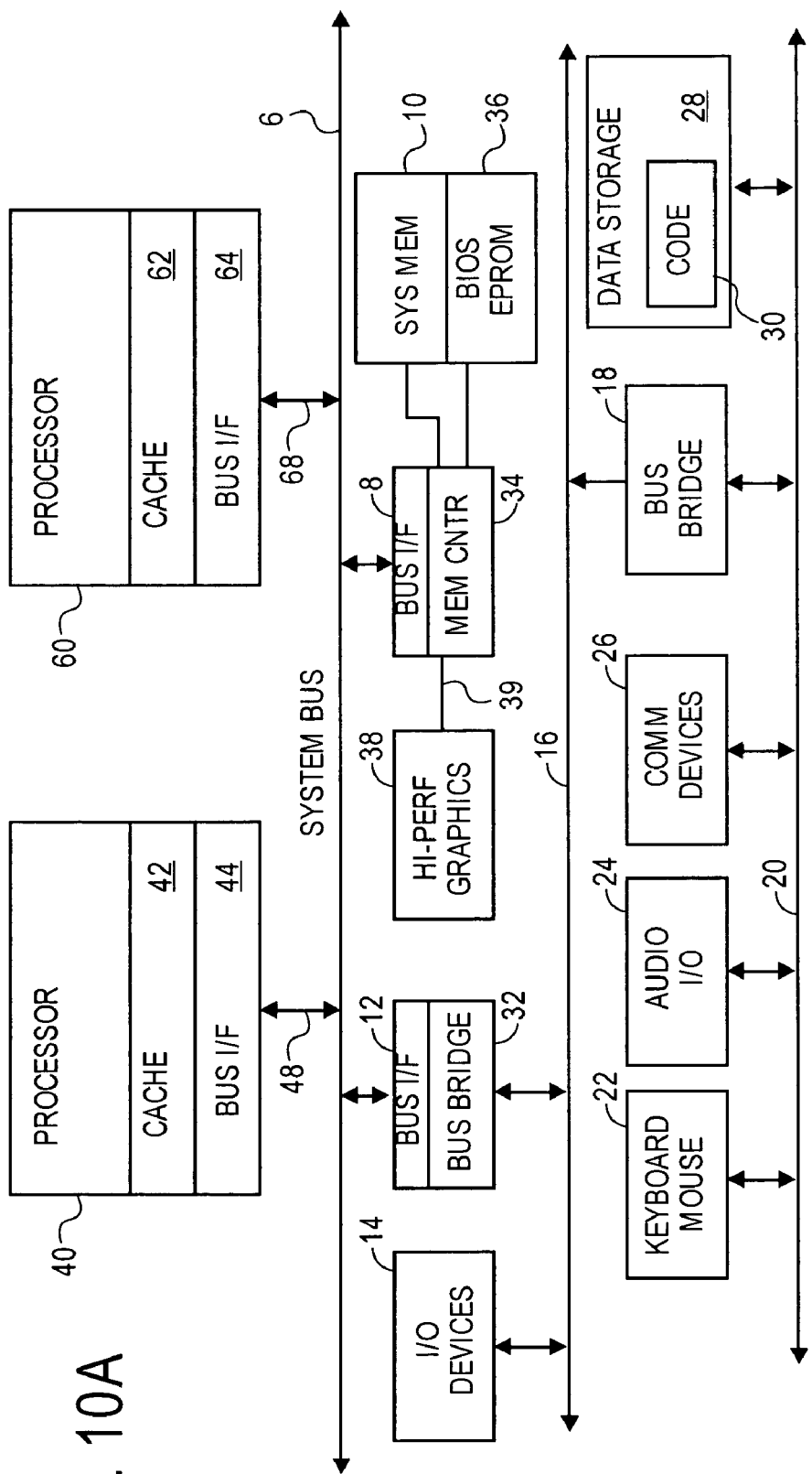
FIG. 10A is a schematic diagram of a system including processors with throttles and multiple cores, according to an embodiment of the present disclosure.
Figure 10B:
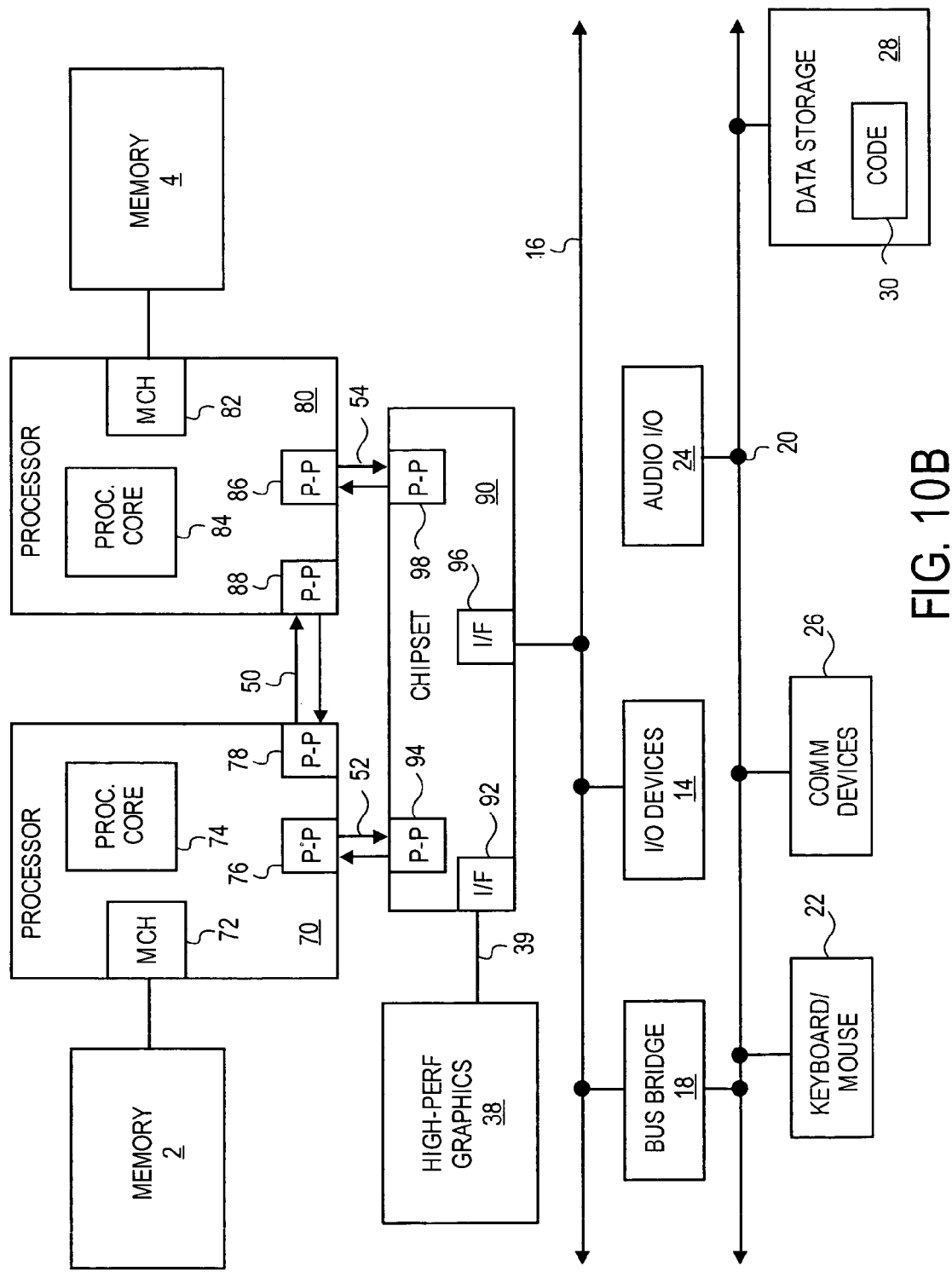
FIG. 10B is a schematic diagram of a system including processors with throttles and multiple cores, according to another embodiment of the present disclosure.

Referring now to FIGS. 10A and 10B, schematic diagrams of systems including processors with throttles and multiple cores are shown, according to two embodiments of the present disclosure. The FIG. 10A system generally shows a system where processors, memory, and input/output devices are interconnected by a system bus, whereas the FIG. 10B system generally shows a system where processors, memory, and input/output devices are interconnected by a number of point-to-point interfaces.

The FIG. 10A system may include one or several processors, of which only two, processors 40, 60 are here shown for clarity. Processors 40, 60 may include level one caches 42, 62. The FIG. 10A system may have several functions connected via bus interfaces 44, 64, 12, 8 with a system bus 6. In one embodiment, system bus 6 may be the front side bus (FSB) utilized with Pentium® class microprocessors manufactured by Intel® Corporation. In other embodiments, other busses may be used. In some embodiments memory controller 34 and bus bridge 32 may collectively be referred to as a chipset. In some embodiments, functions of a chipset may be divided among physical chips differently than as shown in the FIG. 10A embodiment.

Memory controller 34 may permit processors 40, 60 to read and write from system memory 10 and from a basic input/output system (BIOS) erasable programmable read-only memory (EPROM) 36. In some embodiments BIOS EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

The FIG. 10B system may also include one or several processors, of which only two, processors 70, 80 are shown for clarity. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. Chipset 90 may also exchange data with a high-performance graphics circuit 38 via a high-performance graphics interface 92.

In the FIG. 10A system, bus bridge 32 may permit data exchanges between system bus 6 and bus 16, which may in some embodiments be a industry standard architecture (ISA) bus or a peripheral component interconnect (PCI) bus. In the FIG. 10B system, chipset 90 may exchange data with a bus 16 via a bus interface 96. In either system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A processor having at least one large core and a plurality of small cores, comprising:
    a monitor logic to monitor a value of an attribute of said large core;
    a convert logic to determine a measure of power consumption of said processor responsive to said attribute; and
    a control logic to adjust an energy per instruction metric of said processor responsive to said measure of power consumption by transferring threads executed by said large core to two or more of said small cores to be executed in parallel.

2. The processor of claim 1, wherein said attribute of said core is a core running state.

3. The processor of claim 2, wherein said measure of power consumption is determined by multiplying said core running state by the amount of energy expended per clock when said core is in said core running state.

4. The processor of claim 1, wherein said attribute of said core is the number of instructions retired per clock.

5. The processor of claim 4, wherein said measure of power consumption is determined by multiplying said number of instructions retired per clock by the amount of energy expended per instruction per clock.

6. The processor of claim 1, wherein said attribute of said core is active status of a functional block of said core.

7. The processor of claim 6, wherein said measure of power consumption is determined by multiplying said active status of said functional block by the amount of energy expended per clock when said functional block is in said active status.

8. The processor of claim 1, wherein said attribute is a core supply current.

9. The processor of claim 8, wherein said measure of power consumption includes said core supply current.

10. The processor of claim 1, wherein said control logic to adjust an operating voltage and an operating frequency of said processor responsive to said measure of power consumption.

11. The processor of claim 1, wherein said control logic to turn on optional performance circuitry in said core of said processor responsive to said measure of power consumption.

12. The processor of claim 1, wherein said control logic to turn on optional speculation circuitry in said core of said processor responsive to said measure of power consumption.

13. The processor of claim 1, further comprising difference logic to compute a difference between said measure of power consumption and a desired power consumption.

14. The processor of claim 13, further comprising integrating circuitry to determine a time integral of said difference between said measure of power consumption and a desired power consumption.

15. The processor of claim 13, further comprising sampling circuitry to supply said measure of power consumption to said control logic according to a sampling method.

16. The processor of claim 1, further comprising a clock throttle circuit to permit fast feedback control.

17. A processor, comprising:
a first plurality of a first type of cores;
a second plurality of a second type of cores; and
a module to allocate a plurality of threads to one of either said first plurality of said first type of cores or said second plurality of said second type of cores, wherein said module to allocate said thread according to a power budget and the plurality of threads are executed in parallel when allocated to the second plurality of cores.

18. The processor of claim 17, wherein said module to allocate said thread according to an allocation table.

19. The processor of claim 17, wherein said module includes a thread migration logic to allocate a new thread to one of said second plurality of cores and to migrate an existing thread from one of said first plurality of cores to one of said second plurality of cores.

20. The processor of claim 19, wherein said thread migration logic includes a table for mapping logical cores to physical cores.

21. The processor of claim 19, wherein said thread migration logic is responsive to an operating system scheduler.

22. The processor of claim 17, wherein said first type of cores have higher performance than said second type of cores by design.

23. The processor of claim 17, wherein said first type of cores have higher performance than said second type of cores by configuration.

24. A method, comprising:
allocating a set of threads to a set of processor cores, wherein the processors cores comprise one or more large cores and two or more small cores;
monitoring a consumed power of said processor cores;
computing an error value between said consumed power and a desired power; and
transitioning from said allocation from said one or more large cores to said two or more small cores where the threads are executed in parallel based on said error value.

25. The method of claim 24, wherein said transitioning includes changing said allocation of said set of threads among more powerful cores and less powerful cores in said set of processor cores.

26. The method of claim 24, wherein said transitioning includes changing said allocation of said set of threads among more powerful cores and less powerful cores by configuring said more powerful cores and said less powerful cores in said set of processor cores.

27. The method of claim 24, further comprising integrating said error value over time.

28. The method of claim 24, further comprising sampling said error value over time.

29. A system, comprising:
a processor having a large core and a plurality of small cores including a monitor logic to monitor a value of an attribute of said large core, a convert logic to determine a measure of power consumption of said processor responsive to said attribute, and a control logic to adjust an energy per instruction metric of said processor responsive to said measure of power consumption by transferring threads executed by said large core to two or more of said small cores to be executed in parallel; and
an audio input-output logic; and an interface to couple said processor to said audio input-output logic.

30. The system of claim 29, wherein said attribute of said core is a core running state, and wherein said measure of power consumption is determined by multiplying said core running state by the amount of energy expended per clock when said core is in said core running state.

31. The system of claim 29, wherein said attribute of said core is the number of instructions retired per clock, and wherein said measure of power consumption is determined by multiplying said number of instructions retired per clock by the amount of energy expended per instruction per clock.

32. The system of claim 29, wherein said attribute of said core is active status of a functional block of said core, and wherein said measure of power consumption is determined by multiplying said active status of said functional block by the amount of energy expended per clock when said functional block is in said active status.

33. The system of claim 29, wherein said attribute is a core supply current, and wherein said measure of power consumption includes said core supply current.

34. The system of claim 29, wherein said control logic to adjust an operating voltage and an operating frequency of said processor responsive to said measure of power consumption.

35. The system of claim 29, wherein said control logic to migrate threads of a program between large cores and small cores of said processor responsive to said measure of power consumption.

36. The system of claim 29, wherein said control logic to turn on optional performance circuitry in said core of said processor responsive to said measure of power consumption.

37. The system of claim 29, wherein said control logic to turn on optional speculation circuitry in said core of said processor responsive to said measure of power consumption.

38. The system of claim 29, wherein said processor further comprises difference logic to compute a difference between said measure of power consumption and a desired power consumption.

39. The system of claim 38, wherein said processor further comprises integrating circuitry to determine a time integral of said difference between said measure of power consumption and a desired power consumption.

40. The system of claim 39, further comprising sampling circuitry to supply said measure of power consumption to said control logic according to a sampling method.

41. A system, comprising:
a processor including a first plurality of a first type of cores, a second plurality of a second type of cores, and a module to allocate a plurality of threads to one of either said first plurality of said first type of cores or said second plurality of said second type of cores, wherein said module to allocate said thread according to a power budget and the plurality of threads are executed in parallel when allocated to the second plurality of cores; and
an audio input-output logic; and an interface to couple said processor to said audio input-output logic.

42. The system of claim 41, wherein said module to allocate said thread according to a power budget.

43. The system of claim 41, wherein said module to allocate said thread according to an allocation table.

44. The system of claim 41, wherein said module includes a thread migration logic to allocate a new thread to one of said second plurality of cores and to migrate an existing thread from one of said first plurality of cores to one of said second plurality of cores.

45. The system of claim 44, wherein said thread migration logic includes a table for mapping logical cores to physical cores.

46. A processor, comprising:
means for allocating a set of threads to a set of processor cores including a large core and a plurality of small cores;
means for monitoring a consumed power of said processor cores;
means for computing an error value between said consumed power and a desired power; and means for transitioning from said allocation based on said error value by transferring threads executed by said large core to two or more of said small cores to be executed in parallel.

47. The processor of claim 46, wherein said means for transitioning includes means for changing said allocation of said set of threads among more powerful cores and less powerful cores in said set of processor cores.

48. The processor of claim 46, wherein said means for transitioning includes means for changing said allocation of said set of threads among more powerful cores and less powerful cores by configuring said more powerful cores and said less powerful cores in said set of processor cores.

49. The processor of claim 46, further comprising means for integrating said error value over time.

50. The processor of claim 46, further comprising means for sampling said error value over time.

* * * * *